United States Patent
Wetmore

(10) Patent No.: US 7,088,232 B2
(45) Date of Patent: Aug. 8, 2006

(54) SYSTEM AND METHOD FOR REDUCING RADIATION WHEN DISTRIBUTING BROADBAND COMMUNICATION SIGNALS OVER POWER LINES

(76) Inventor: Evans Wetmore, 1609 Fifth St., Manhattan Beach, CA (US) 90266

(\*) Notice: Subject to any disclaimer, the term of this patent is extended or adjusted under 35 U.S.C. 154(b) by 155 days.

(21) Appl. No.: 10/792,677

(22) Filed: Mar. 3, 2004

(65) Prior Publication Data
US 2005/0194838 A1  Sep. 8, 2005

(51) Int. Cl.
  *G08B 1/08* (2006.01)
  *H04M 11/04* (2006.01)
  *H04Q 1/30* (2006.01)

(52) U.S. Cl. .................. 340/538; 340/310.11; 375/258

(58) Field of Classification Search ................. 340/538, 340/538.11, 538.12, 310.11, 310.13; 375/258, 375/259
See application file for complete search history.

(56) References Cited

U.S. PATENT DOCUMENTS

| | | | |
|---|---|---|---|
| 3,974,404 A | 8/1976 | Davis | 307/303 |
| 4,021,797 A | 5/1977 | Hofmeister | 340/310 |
| 4,130,861 A | 12/1978 | LaForest | 363/39 |
| 4,510,611 A * | 4/1985 | Dougherty | 375/222 |
| 4,908,600 A * | 3/1990 | Martinez | 340/538.11 |
| 5,349,666 A | 9/1994 | Adachi et al. | 395/750 |
| 5,481,478 A * | 1/1996 | Palmieri et al. | 709/208 |
| 5,485,040 A | 1/1996 | Sutterlin | 307/3 |
| 5,521,491 A * | 5/1996 | Najam | 324/86 |
| 5,818,127 A | 10/1998 | Abraham | 307/106 |
| 5,844,327 A * | 12/1998 | Batson | 307/64 |
| 5,929,749 A | 7/1999 | Slonim et al. | 340/310.01 |
| 5,970,138 A | 10/1999 | Suda et al. | 379/412 |
| 5,977,650 A | 11/1999 | Rickard et al. | 307/3 |
| 6,037,678 A | 3/2000 | Rickard | 307/89 |
| 6,104,707 A * | 8/2000 | Abraham | 370/295 |
| 6,144,290 A | 11/2000 | Duval et al. | 340/310.01 |
| 6,407,987 B1 * | 6/2002 | Abraham | 370/295 |
| 6,441,723 B1 | 8/2002 | Mansfield, Jr. et al. | 340/310.01 |
| 6,496,104 B1 | 12/2002 | Kline | 340/310.01 |
| 6,504,402 B1 | 1/2003 | Horiguchi et al. | 326/121 |
| 6,515,485 B1 | 2/2003 | Bullock et al. | 324/601 |
| 6,522,626 B1 | 2/2003 | Greenwood | 370/208 |
| 6,549,120 B1 | 4/2003 | de Buda | 340/310.01 |
| 2002/0024423 A1 | 2/2002 | Kline | 340/310.01 |
| 2002/0109585 A1 | 8/2002 | Sanderson | 340/310.01 |
| 2003/0006881 A1 | 1/2003 | Reyes | 340/310.01 |
| 2003/0039317 A1 | 2/2003 | Taylor et al. | 375/295 |
| 2003/0071719 A1 | 4/2003 | Crenshaw et al. | 340/310.01 |
| 2003/0071721 A1 | 4/2003 | Manis et al. | 340/310.03 |
| 2003/0095036 A1 | 5/2003 | Wasaki et al. | 340/310.01 |
| 2003/0133473 A1 | 7/2003 | Manis et al. | 370/480 |
| 2003/0137405 A1 | 7/2003 | Kaku et al. | 340/310.01 |
| 2003/0156012 A1 | 8/2003 | Omidi et al. | 340/310.01 |
| 2003/0156014 A1 | 8/2003 | Kodama et al. | 340/310.01 |
| 2003/0160684 A1 | 8/2003 | Cern | 340/310.01 |
| 2003/0179080 A1 | 9/2003 | Mollenkopf et al. | 340/310.01 |
| 2003/0190110 A1 | 10/2003 | Kline | 385/15 |

\* cited by examiner

*Primary Examiner*—John Tweel, Jr.
(74) *Attorney, Agent, or Firm*—Sofer & Haroun, LLP

(57) ABSTRACT

A system for decreasing high frequency (HF) radiation emission in a power line comprises a first transmitter configured to transmit a utility power signal over the power line. A second transmitter transmits a high frequency communication signal over the power line so as to provide a combined utility and high frequency signal. A plurality of modulators, each of which provides a differential output signal to at least two phases of the power line such that the same high frequency data signal is transmitted via at least two phases of the power transmission line in an out-of-phase arrangement.

26 Claims, 5 Drawing Sheets

SYSTEM AND METHOD FOR REDUCING RADIATION WHEN DISTRIBUTING BROADBAND COMMUNICATION SIGNALS OVER POWER LINES

FIELD OF THE INVENTION

This invention relates to data communications, and more specifically to a broadband communication system employing power distribution and transmission lines.

BACKGROUND OF THE INVENTION

Within the past few years a new mode of communicating data has been accomplished by employing existing power lines. This mode of communications is referred to as broadband over power lines (BOPL). BOPL allows power utility companies to utilize their backbone electric grid infrastructure to offer customers high speed telecommunications services. Thus, power utility companies can now provide continuous high speed Internet access by modest changes of their existing plant.

Broadband over power line technology employs building, underground, and/or overhead power lines to conduct HF and VHF digital signals for allowing computers to connect to the Internet. The FCC views this technology as a competitive Internet access point, and the utilities view the technology as a means to use existing infrastructure to generate additional revenue from something other than power generation, transmission, and distribution.

One important concern about transmission of high frequency signals over power lines is electromagnetic radiation from the power lines into already used frequency channels. More specifically, for high frequency signals, the power line may act as an antenna that is able to emanate electromagnetic radiation leading to a significant interference to over-the-air radio services.

Under current FCC regulations, power transmission lines may emit signals having a power of up to 30 microvolts/meter at a distance of 30 meters from the source. However, such emission levels could easily interfere with other overlapping frequency channels, such as those used by the Amateur Radio Service. The problem with such interference is that it affects not only the Amateur Radio community, but also those who employ radio services using High Frequency (HF) spectrum.

Thus, there is a need for an arrangement that can effectively overcome the problems arising from transmission of high frequency signals over power lines.

SUMMARY OF THE INVENTION

In accordance with one embodiment of the invention high frequency signals are carried over an electric utility power line employing one or more phases plus a neutral wire with a voltage signal level kept at or near ground potential. High frequency data signals are fed into each line with a different phase in a balanced arrangement so as to minimize radiation.

In accordance with another embodiment of the invention, high frequency signals are generated via an amplifier that provides a balanced output signal. As such the amplifier includes two output ports, each of which provides a signal, which is nominally 180 degrees out of phase with the other. The high frequency signals are then fed to corresponding phases of a power line via an isolating device. The isolating device allows the high frequency signal to be fed to the power line, while preventing the voltage signal on the power line to be fed to the amplifier.

In accordance with another embodiment of the invention, the balanced feed is accomplished by employing two modulators or amplifiers, whose local oscillators are locked together 180 degrees out of phase. If the same modulation scheme is applied in both modulators or amplifiers, then their outputs taken together will be balanced.

In accordance with other embodiments of the invention, other schemes to generate signals that are nominally 180 degrees out of phase may be employed, such as providing an infrared link, or a fiber link or a wire link between the modulators. Furthermore, the local oscillators may act in a master-slave configuration where the master sets the system phase and the slave locks to it. In accordance with yet another embodiment of the invention a master oscillator is provided, to which other local oscillators lock. The balanced feeding arrangement can be employed in accordance with another embodiment of the invention, between one of the voltage phases and the neutral phase. This and other embodiments of the invention will be explained in the more detail in connection with the accompanying figures.

DETAILED DESCRIPTION OF THE INVENTION

Figure 1:
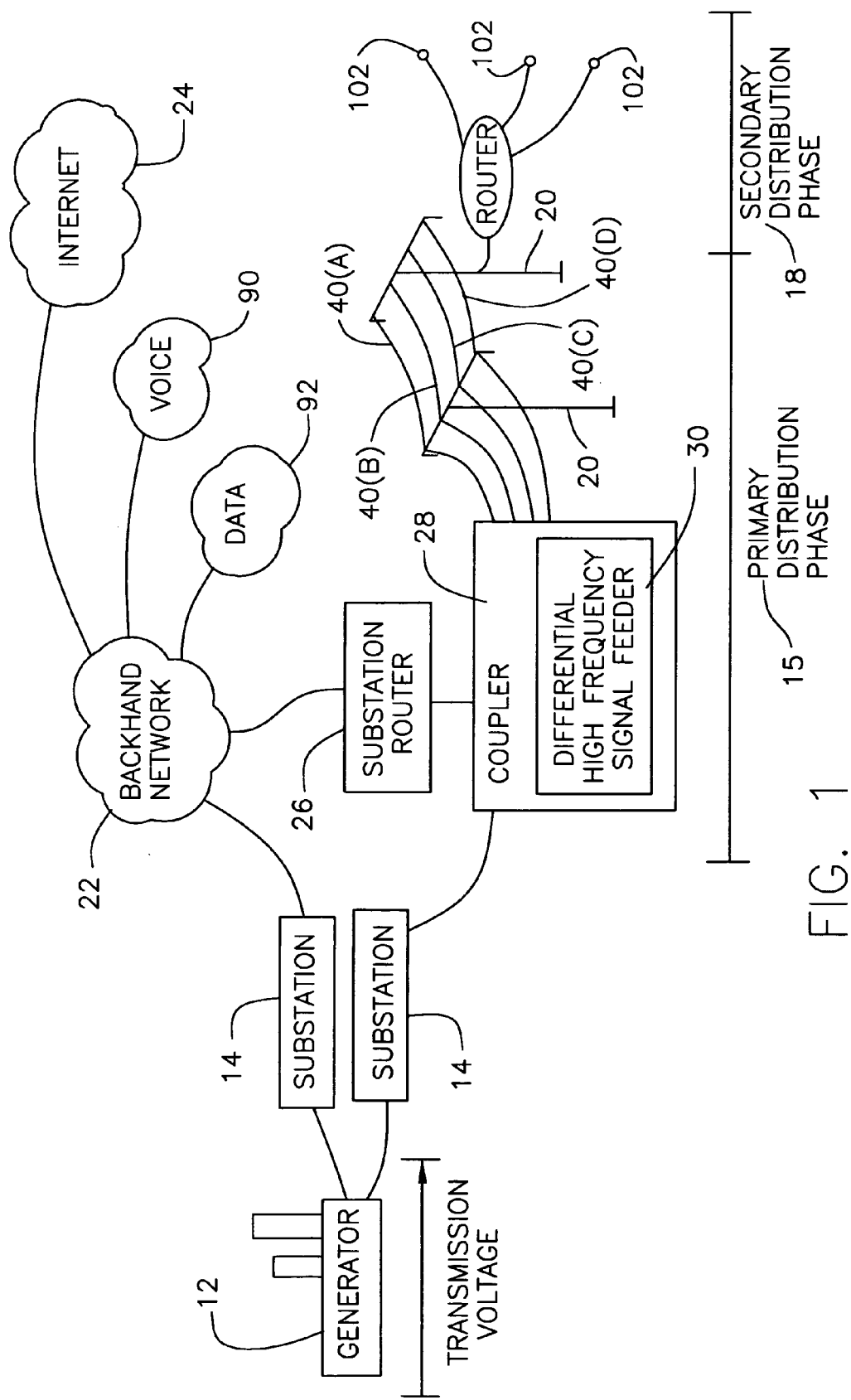
FIG. 1 illustrates a system that allows transmission of broadband signals over power lines in accordance with one embodiment of the invention.

FIG. 1 illustrates an electric distribution arrangement that is employed to carry high frequency communication signals. Typically, a generating station 12 provides transmission voltage signals to substations 14. At a primary distribution phase 15, substations 14 are in turn coupled to electric poles 20, for direction power lines 40a, 40b, 40c and 40d towards end users. At a secondary distribution phase 18, the voltage signal is stepped down, for transmitting power to end user homes and offices.

A backhaul network 22 is coupled to an Internet network 24 from one end and to the electric distribution system on the other end. Backhaul network 22 is coupled to a substation router 26, which in turn is coupled to a utility line via a coupler 28. Coupler 28 includes a differential high frequency signal feeder 30 as described in more detail in reference with FIGS. 2–7 below. High frequency signal feeder 30 is configured to provide high frequency communication signals in a balanced arrangement, such that the signals provided to each phase of the power line are out of phase with respect to each other, preferably within 180 degrees.

As such, backhaul network 22 provides Internet communication signals to the transmission lines, and ultimately to end user's 102 electric outlets. It is noted that the invention is not limited in scope in that respect and other high frequency signals such as those generated within voice networks 90 and other types of data networks 92 can be injected into the utility lines.

Figure 2:
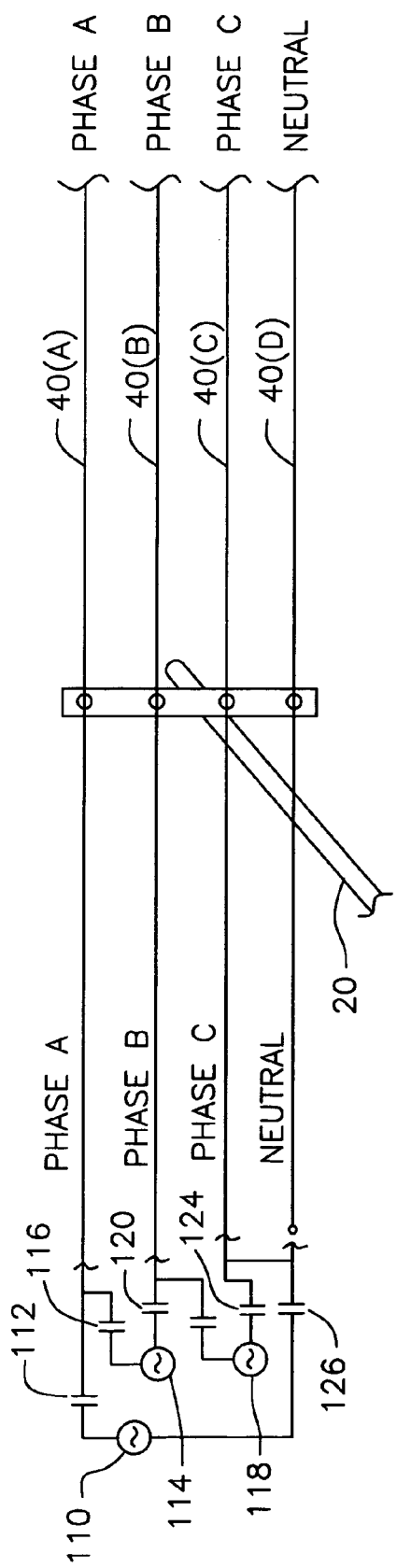
FIG. 2 illustrates a portion of a transmission line illustrated in FIG. 1, with a balanced feed arrangement for providing high frequency signals to three phases of a power transmission line in accordance with one embodiment of the invention.

FIG. 2 illustrates an electric pole 20 with a portion of the utility lines extending therefrom in accordance with one embodiment of the invention. As illustrated each utility line 40(*a*)–40(*d*) is configured to carry one phase of a three-phase power signal. For example line 40(*a*) is configured to carry an active phase A signal, whereas lines 40(*b*) and 40(*c*) carry active phase B and phase C signals respectively. Finally, line 40(*d*) is the neutral phase of the power transmission line, wherein the signal level is set to ground potential.

High frequency data signals are fed to the power transmission lines via modulators 110, 114, 118 and 126 respectively. In accordance with one embodiment of the invention, these modulators are located within differential high frequency signal feeder 30.

It is noted that instead of modulators, high frequency amplifiers are employed in accordance with another embodiment of the invention. As such, it is appreciated by those skilled in the art that in connection with the description of the various embodiments of the invention, high frequency amplifiers and modulators are interchangeable.

Modulator 110 includes two output ports, one of which is coupled to phase A of power transmission line via capacitor 112. The other output port of modulator 110 is coupled to phase C of power transmission line via capacitor 126. Modulator 110 provides two output signals, 180 degrees out of phase with respect to each other.

Similarly, modulator 114 includes two output ports, one of which is coupled to phase A of power transmission line via capacitor 116. The other output port of modulator 114 is coupled to phase B of power transmission line via capacitor 120. Modulator 114 provides two output signals, 180 degrees out of phase with respect to each other.

Finally, modulator 118 includes two output ports, one of which is coupled to phase B of power transmission line via capacitor 122. The other output port of modulator 118 is coupled to phase C of power transmission line via capacitor 124. Modulator 118 provides two output signals, 180 degrees out of phase with respect to each other.

The use of the differential feeding arrangement in accordance with various embodiments of the present invention, substantially reduces the radiation emitted by the utility line 40 when carrying a high frequency HF communication signal.

Figure 3:
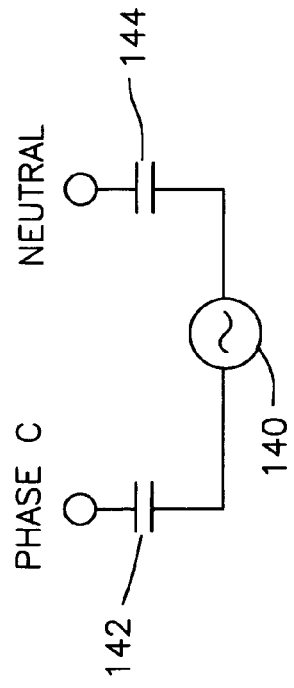
FIG. 3 illustrates a differential feeding arrangement for providing high frequency signal to a single phase of a power transmission line via a capacitive coupling in accordance with one embodiment of the invention.

FIG. 3 illustrates another embodiment of the invention wherein a modulator 140 providing a differential output signal, provides a high frequency data, via capacitors 142 and 144, to each phase of the transmission line, such as phase C and the neutral line respectively. The output data signals provided by the modulator is nominally 180 degrees out of phase with respect to each other. As such three separate modulators are employed each of which is feeding one phase of the transmission line and the neutral line.

Figure 4:
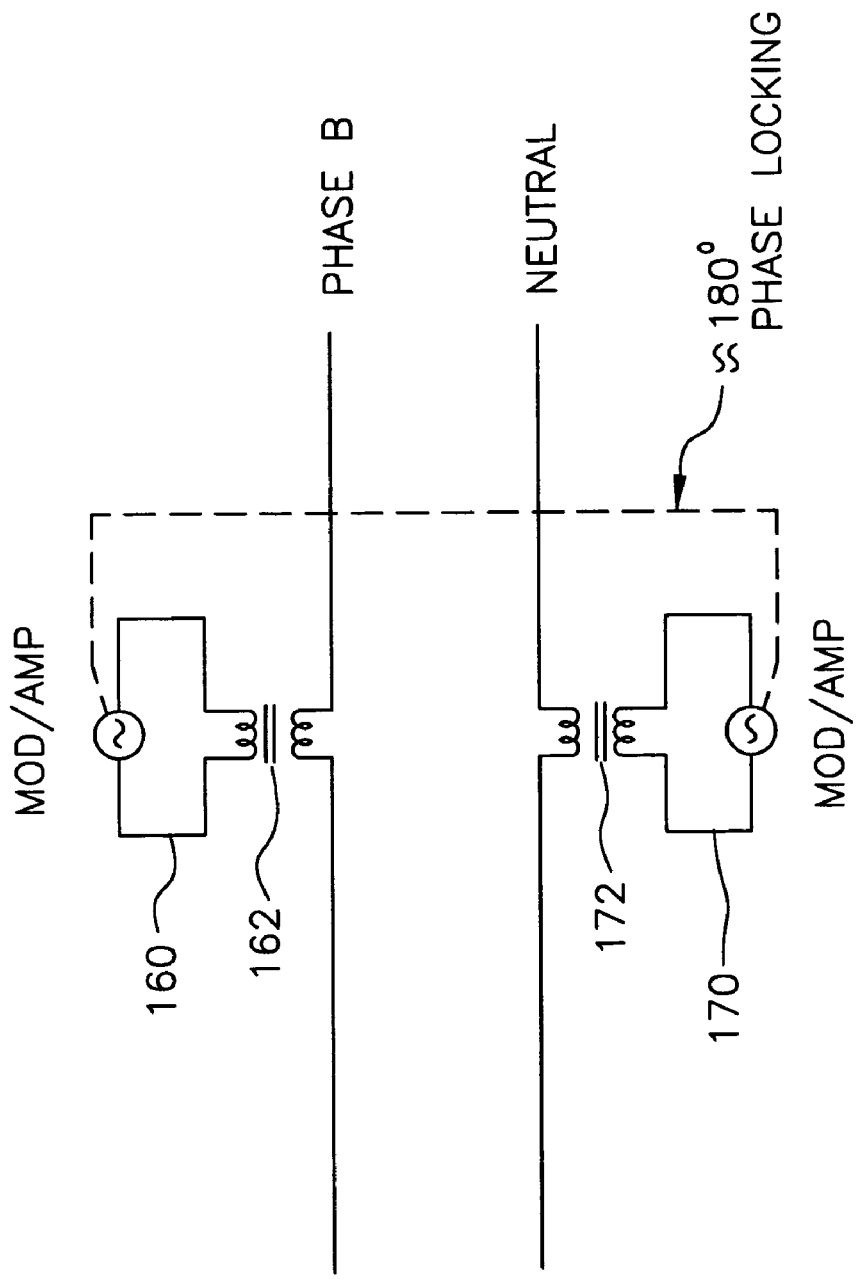
FIG. 4 illustrates a differential feeding arrangement for providing high frequency signal to a single phase of a power transmission line via an inductive coupling in accordance with one embodiment of the invention.

FIG. 4 illustrates a balanced feeding arrangement in accordance with another embodiment of the invention. Modulators 160 and 170 provide a nominal 180 degrees out of phase high frequency data signal. It is noted that modulators that provide a balanced output, such as 160 and 170, employ the same modulation scheme. The output port of modulator 160 is coupled via an inductor 162 to one of the phase lines of the power transmission line, and the output port of modulator 170 is coupled via an inductor 172 to the neutral line. The phase of the output signals generated by modulators 160 and 170 are locked to remain nominally 180 degrees out of phase with respect to each other.

Figure 5:
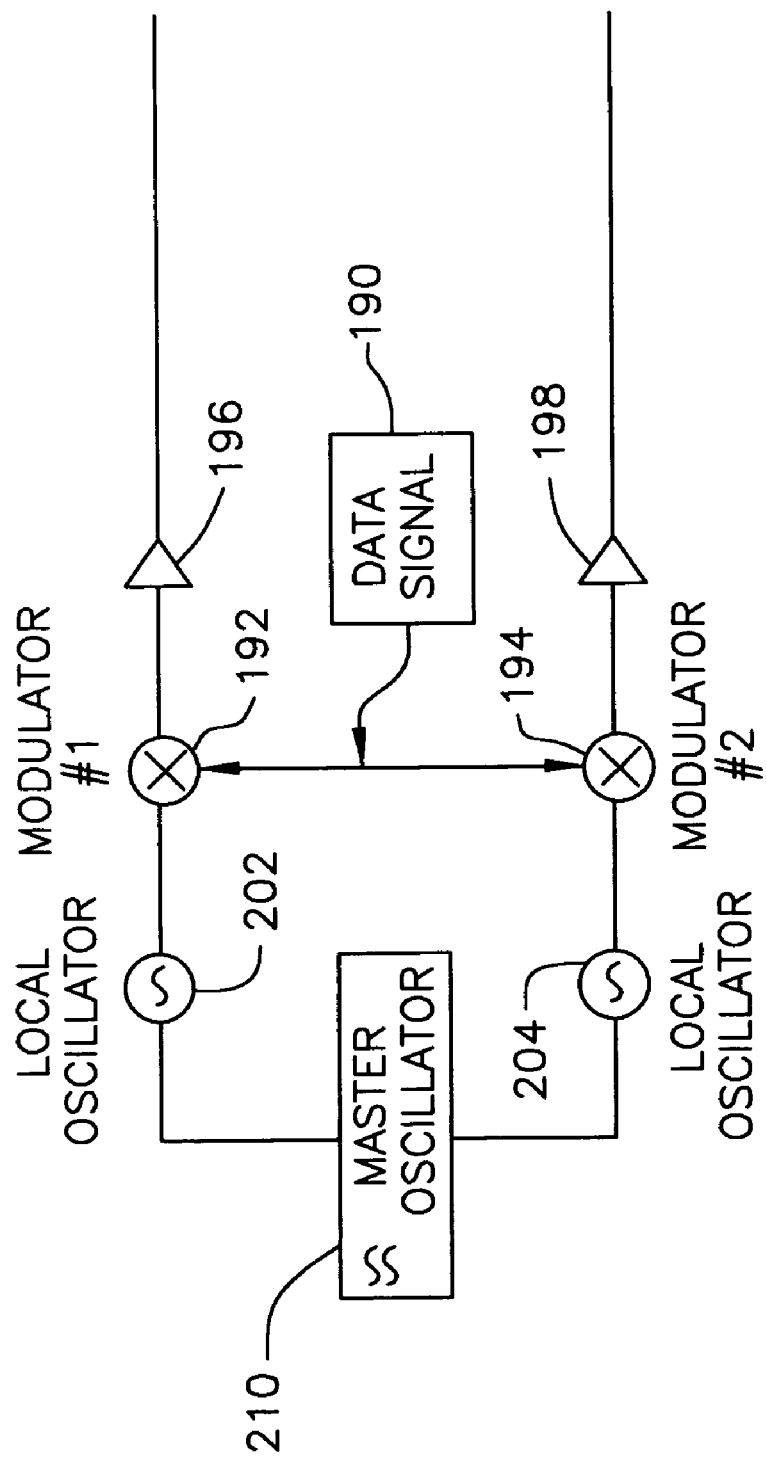
FIG. 5 illustrates a differential feeding arrangement for providing high frequency signal to a power transmission line via two separate modulators being nominally 180 degrees out of phase with respect to each other.

FIG. 5 illustrates a balanced feeding arrangement in accordance with yet another embodiment of the invention. A local oscillator 202 is configured to provide a high frequency signal to modulator 192. The output port of modulator 192 is coupled to one of the phase lines of the power transmission line as discussed above in connection with FIGS. 1–4. Similarly, a local oscillator 204 is configured to provide a high frequency signal to modulator 194. The output port of modulator 194 is coupled to another one of the phase lines of the power transmission line as discussed above. A data signal source 190 is configured to provide data signals to each of the modulators. Local oscillators 202 and 204 are configured to remain nominally 180 degrees out of phase with respect to each other. As such the modulated data signal provided to the power transmission line includes an in-phase and a nominal 180 degrees out of phase component, wherein together substantially reduce the unintentional radiation generated by the high frequency data signals.

In accordance with one embodiment of the invention, in order for the local oscillators to remain nominally 180 degrees out of phase, a master oscillator 210 provides a signal, to which both oscillators 202 and 204 are coupled in a master-slave arrangement. Alternatively, one of the local oscillators may act as a master oscillator and the other oscillator is configured to operate as a slave configuration.

Figure 6:
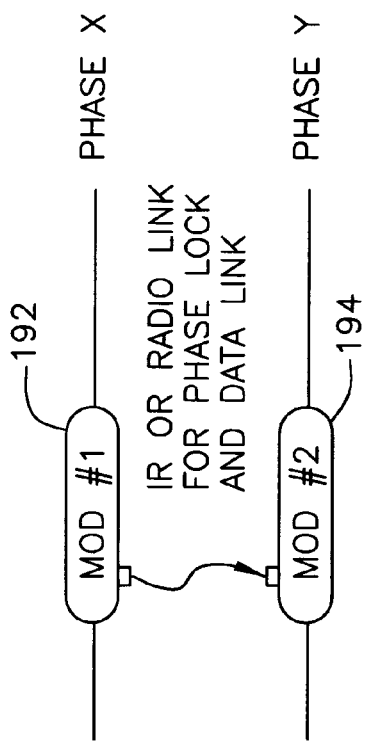
FIG. 6 illustrates a differential feeding arrangement for providing high frequency signal to a power transmission line via two modulators communicating via a wireless channel.

FIG. 6 illustrates one embodiment for providing a linking arrangement between the two modulators 192 and 194 illustrated in FIG. 5. Thus, modulator 192 communicates with modulator 194 to provide phase locking information for the local oscillators 202 and 204. Furthermore, the data signal provided by data signal source 190 is also communicated via a communications channel set up between the two modulators. The communication channel in accordance with one embodiment of the invention is a wireless connection such as an Infrared connection or a radio link connection. As explained above, the output port of each of the modulators is coupled to one of the phase lines of the power transmission line.

Figure 7:
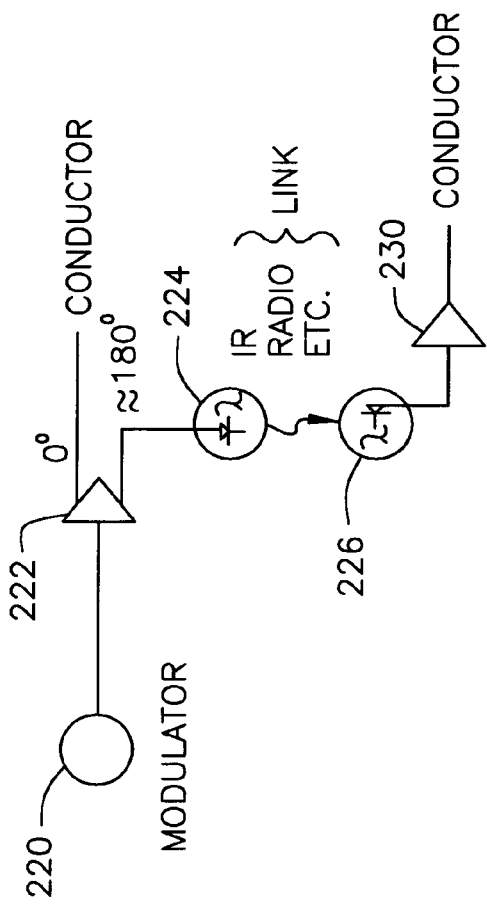
FIG. 7 illustrates a differential feeding arrangement for providing high frequency signal to a power transmission line via a modulator having a differential output circuit.

FIG. 7 illustrates a modulator 220 having a different output port. As such, an output port of modulator 220 is coupled to an amplifier 222 having an in-phase output port and an 180 degrees out-of-phase output port. The in-phase output port is coupled to a phase line of the power transmission line. The out-of-phase output port is coupled to a second phase line of the power transmission line via an infra red transmitter 224, and an infra red receiver 226 coupled to a second amplifier 230. In accordance with various embodiments of the invention, the infra red connection may be replaced by a fiber optic or a radio or a wired connection.

It is noted that for all the embodiments described herein, even though the data signal is placed on the power transmission lines in a balanced manner, the data signal may be removed in an unbalanced manner, i.e., single ended, as there will be HF current flowing in any given phase.

Furthermore, although the modulators described in connection with the above embodiments provide 180 degrees out of phase signals, the invention is not limited in scope in that respect. For example, the high frequency signals provided to the power line may be sufficiently out of phase to substantially reduce the electromagnetic radiation arising from the transmission of the high frequency data signal. The electromagnetic reduction is a function of line characteristics desired by the operator of the transmission line.

Thus, in accordance to various embodiments of the invention, it is possible to reduce the radiation emitted from the transmission lines that carry high frequency communication signals. This is accomplished by providing a balanced output signal to various lines of the power transmission line.

I claim:

1. A system for decreasing high frequency (HF) radiation emission in a power line comprising:
   a first transmitter configured to transmit a utility power signal over said power line;
   a second transmitter configured to transmit a high frequency communication signal over said power line so as to provide a combined utility and high frequency signal over said power line; and
   a plurality of modulators, each of which providing a differential output signal to at least two phases of said power line such that the same high frequency data signal is transmitted via at least said two phases of the power transmission line in an out-of-phase arrangement.

2. The invention in accordance with claim 1 wherein said plurality of modulators further comprise a first, second, and third modulators, wherein said first modulator is coupled to a first and third phase of said power line, and said second modulator is coupled to said first and a second phase of the power line, and said third modulator is coupled to said second and third phase of power line, and each of said modulators generates a first and second high frequency data signal substantially 180 degrees out-of-phase with respect to each other.

3. The system in accordance with claim 2, wherein each of said modulators is coupled to a corresponding phase line via a capacitance.

4. The system in accordance with claim 1 wherein at least one of said phase lines is the neutral phase of the power line.

5. The system in accordance with claim 1 wherein each of said modulators further comprises an amplifier having an in-phase output port and an out-of phase output port, said in-phase output port coupled to one phase of said power line.

6. The system in accordance with claim 5, wherein said out-of-phase output port is coupled to a second amplifier, an output port of said second amplifier is coupled to a second phase of said power line.

7. The system in accordance with claim 6, wherein said out-of-phase output port is coupled to said second amplifier via an infra red link.

8. The system in accordance with claim 6, wherein said out-of-phase output port is coupled to said second amplifier via a fiber optic link.

9. The system in accordance with claim 6, wherein said out-of-phase output port is coupled to said second amplifier via a radio link.

10. The system in accordance with clam 6, wherein said out-of-phase output port is coupled to said second amplifier via a wire link.

11. A system for decreasing high frequency (HF) radiation emission in a power line comprising:
   a first transmitter configured to transmit a utility power signal over said power line;
   a second transmitter configured to transmit a high frequency communication signal over said power line so as to provide a combined utility and high frequency signal over said power line; and
   a plurality of modulators, each of which providing an output signal to a corresponding phase of said power line, wherein the same high frequency data signal is transmitted via at least two phases of the power line in an out-of-phase arrangement.

12. The system in accordance with claim 11, wherein said at least two phases of the power line is coupled to a first and a second modulator, phase locked to each other at substantially 180 degrees.

13. The system in accordance with claim 12, wherein said modulators provide the high frequency communication signal via an inductor.

14. The system in accordance with claim 12, wherein one of said phase lines is a neutral phase of the power line.

15. The system in accordance with claim 12, further comprising a data signal source configured to provide a data signal to at least two of said modulators, each of said modulators further coupled to a local oscillator so as to modulate said data signal to said high frequency data signal, wherein said local oscillators are locked to each other at substantially 180 degrees.

16. The system in accordance with claim 15 further comprising a master oscillator coupled to each of said local oscillators, wherein a first local oscillator is locked in phase with said master oscillator and a second local oscillator is locked out-of-phase with said master oscillator.

17. The system in accordance with claim 12 wherein said first and second modulators communicate together via a wireless connection.

18. The system in accordance with claim 17, wherein said first and second modulators communicate data relating to phase locking arrangement between each other.

19. The system in accordance with claim 17 wherein said wireless connection is a radio link.

20. The system in accordance with claim 17 wherein said wireless connection is an infra red link.

21. A method for decreasing high frequency (HF) radiation emission in a power line comprising the steps of:
   transmitting a utility power signal over said power line; and
   transmitting a high frequency communication signal via a balanced arrangement such that the same high frequency data signal is transmitted via at least two of the phases of the power line in an out-of-phase arrangement.

22. The method in accordance with claim 21, wherein step of transmitting a high frequency signal further comprises the step of maintaining said out-of-phase arrangement at substantially 180 degrees.

23. The method in accordance with claim 21 further comprising the step of providing said high frequency data signal to a first and a second phase of said power line, in an out-of-phase arrangement, providing a second high frequency data signal to said first and a third phase of said power line, and providing a third high frequency data signal to said second and third phase of said power line.

24. The method in accordance with claim 21 wherein one of said at least two phases of the power line is a neutral line.

25. The method in accordance with claim 21 further comprising the step of feeding each of said phases via a capacitance.

26. The method in accordance with claim 21 further comprising the step of feeding each of said phases via an inductance.

* * * * *